United States Patent
Hood

(10) Patent No.: US 9,849,381 B2
(45) Date of Patent: Dec. 26, 2017

(54) METHODS AND SYSTEMS OF AUTOMATIC MANAGEMENT ONLINE FANTASY SPORTS ROSTERS

(71) Applicant: Duane Clinton Hood, San Jose, CA (US)

(72) Inventor: Duane Clinton Hood, San Jose, CA (US)

( * ) Notice: Subject to any disclaimer, the term of this patent is extended or adjusted under 35 U.S.C. 154(b) by 103 days.

(21) Appl. No.: 14/798,453

(22) Filed: Jul. 13, 2015

(65) Prior Publication Data

US 2016/0051895 A1 Feb. 25, 2016

Related U.S. Application Data

(60) Provisional application No. 62/029,548, filed on Jul. 27, 2014.

(51) Int. Cl.
| | | |
|---|---|---|
| A63F 13/35 | (2014.01) | |
| A63F 13/90 | (2014.01) | |
| A63F 13/828 | (2014.01) | |
| A63F 13/795 | (2014.01) | |
| A63F 13/70 | (2014.01) | |

(52) U.S. Cl.
CPC ............ *A63F 13/35* (2014.09); *A63F 13/90* (2014.09); *A63F 13/70* (2014.09); *A63F 13/795* (2014.09); *A63F 13/828* (2014.09)

(58) Field of Classification Search
CPC ......... A63F 13/10; A63F 13/12; A63F 3/0615
See application file for complete search history.

(56) References Cited

U.S. PATENT DOCUMENTS

| | | | |
|---|---|---|---|
| 2006/0105827 A1* | 5/2006 | Metzger | ............... A63F 13/10 463/9 |
| 2007/0298886 A1* | 12/2007 | Aguilar, Jr. | ............ G06N 3/006 463/42 |
| 2013/0079073 A1* | 3/2013 | Sharifi | ................. G07F 17/32 463/3 |
| 2014/0274411 A1* | 9/2014 | Moffett | ................ A63F 13/30 463/42 |

* cited by examiner

*Primary Examiner* — Omkar Deodhar

(57) ABSTRACT

In one aspect, a method includes the step of providing an online fantasy sports league. A user interacts with the online fantasy sports league via an application in a computing device. A list of automatic substitution designations is received from the user via the application with respect to a user's starting roster. A step includes determining that a player is ineligible to play in a game. It is determined that the player is on a user's starting roster or in a user's waiver wire. A step includes automatically select a substitute player for an ineligible starting player according a list of automatic substitution designations. The list of automatic substitution designations is stored in a memory of the computing device or an online fantasy sports league server. The user's team roster is automatically updated to include the substitute player in lieu of the ineligible starting player.

5 Claims, 5 Drawing Sheets

METHODS AND SYSTEMS OF AUTOMATIC MANAGEMENT ONLINE FANTASY SPORTS ROSTERS

CROSS-REFERENCE TO RELATED APPLICATIONS

This application is a claims priority from U.S. Provisional Application No. 62/029,548, titled METHODS AND SYSTEMS OF AUTOMATIC MANAGEMENT ONLINE FANTASY SPORTS ROSTERS and filed 27 Jul. 2014. This application is hereby incorporated by reference in its entirety.

FIELD OF THE INVENTION

The invention is in the field of online fantasy sports and more specifically to a method, system and apparatus of methods and systems of automatic management online fantasy sports rosters.

DESCRIPTION OF THE RELATED ART

The fantasy sport (e.g. rotisserie, 'roto', owner simulation, etc.) is a game where participants act as owners to build a team that competes against other fantasy owners based on the statistics generated by the real individual players or teams of a professional sport also see daily fantasy sports. Each team owner can designate which players from the team roster will be starters each week or day—i.e. the only players who will "score" any points. Players can be designated as ineligible to play. For example, a team may report a player as injured shortly before a game begins. The user may occasionally be offline. Accordingly, the user may not be able to manually substitute another player for the ineligible player. In this way, the user's fantasy sports team may score fewer points.

BRIEF SUMMARY OF THE INVENTION

In one aspect, a method includes the step of providing an online fantasy sports league. A user interacts with the online fantasy sports league via an application in a computing device. A list of automatic substitution designations is received from the user via the application with respect to a user's starting roster. A step includes determining that a player is ineligible to play in a game. It is determined that the player is on a user's starting roster or in a user's waiver wire. A step includes automatically select a substitute player for an ineligible starting player according a list of automatic substitution designations. The list of automatic substitution designations is stored in a memory of the computing device or an online fantasy sports league server. The user's team roster is automatically updated to include the substitute player in lieu of the ineligible starting player.

Figure 1:
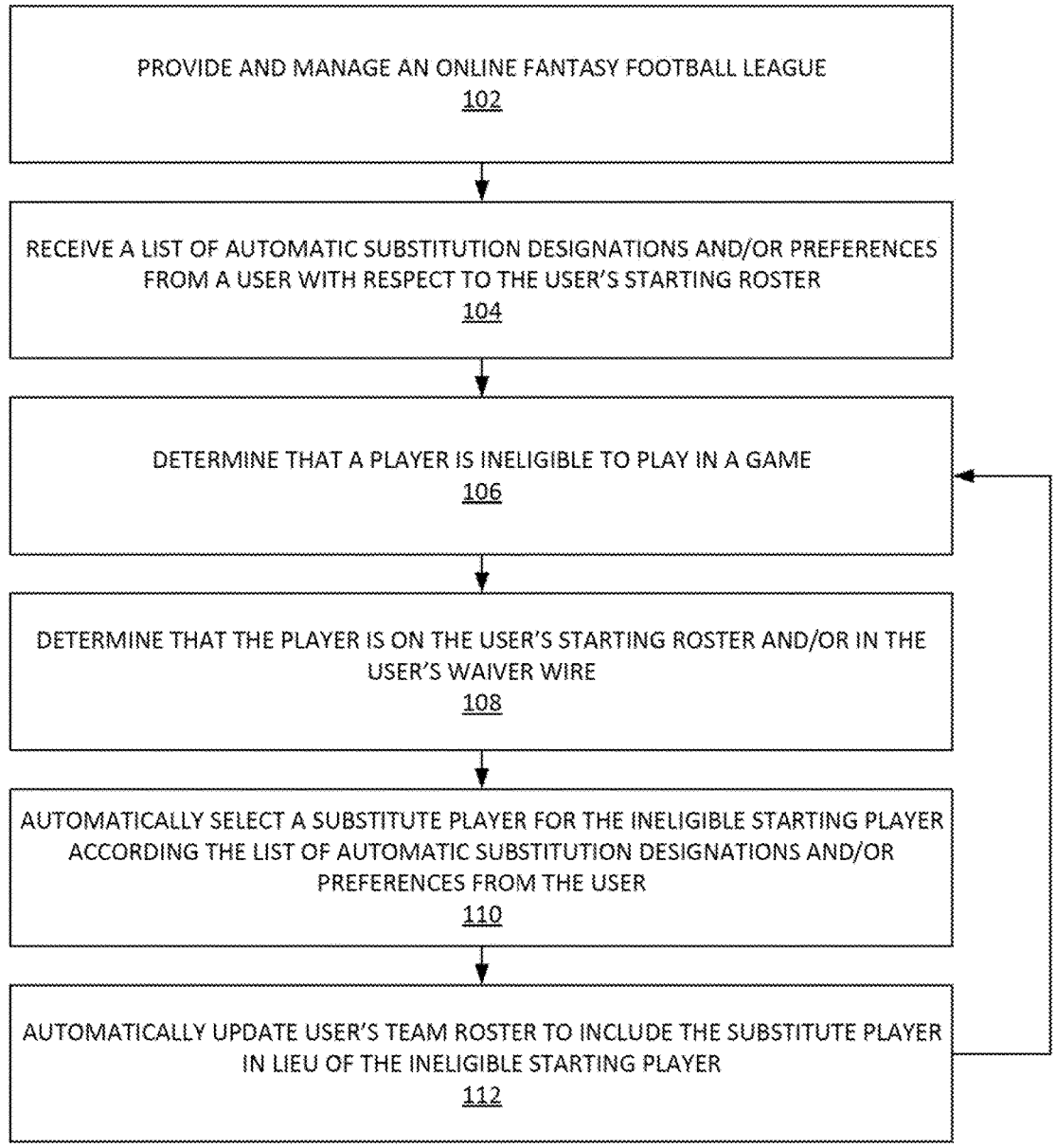
FIG. 1 illustrates an example method for automatic management of online fantasy sports rosters, according to some embodiments.

The Figures described above are a representative set, and are not an exhaustive with respect to embodying the invention.

DESCRIPTION

Disclosed are a system, method, and article of manufacture of automatic management of online fantasy sports rosters. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labelled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definitions

Data scraping (e.g. screen scrapping, web scrapping, report scrapping) can be a technique in which a computer program extracts data from human-readable output coming from another program.

Fantasy football can be an interactive competition in which users compete against each other as general managers of virtual teams built from real players. For example, the players that an individual is able to manage may be professional football players in the National Football League. In other examples, the players can be college football players, Canadian football players, and players in other football leagues.

Fantasy sport (e.g. rotisserie, 'roto', and/or owner simulation) can be a game where participants act as owners to build a team that competes against other fantasy owners based on the statistics generated by the real individual players or teams of a professional sport. In fantasy sports there is the ability to trade, cut, and sign players. A fantasy sport can be football, basketball, baseball, soccer, cricket, bicycle racing, chess, hockey, Olympic sports, horse racing, golf, poker, video-game based sports, other video games, e-gaming (e.g. online gambling), etc.

National Football League (NFL) is a professional American football league.

Exemplary Methods

In one example, an online fantasy football league can be configured provide an online fantasy football league. A fantasy football player (e.g. the 'user') can perform several roles (e.g. the owner, general manager and/or coach) of a fantasy football team. In an exemplary fantasy football league, each team can be allowed a pre-determined number of players on its team, as well as a specified number at each position that can or must be used in each game (e.g. the "starters"). Users, in the role of an owner/manager for each team, can then determine (e.g. each week) which players will start (within the rules) and which will not start (e.g. be benched). Users can select their starters for a game before a certain deadline. Whether to sit or start a player is usually based on strategic considerations including the player's past and expected performance, defensive match ups, and so on.

In one example embodiment, player positions can be initially set for all players in advance of the season based on training camp rosters and official positions as designated by each individual fantasy football team. For example, if a player is listed as a Quarterback, he is eligible to be started on the user's fantasy team as a quarterback. The same is true for all other positions on the user's fantasy roster with the exception being the flex positions (e.g. dependent on a particular fantasy football league settings and/or rules). In the flex positions, a user may start a player that is either a wide receiver or a running back (WR/RB) or a wide receiver or tight end (WR/TE or RB/WR/TE). The user may not start a player at a position for which he is not eligible (i.e. the user may not start a quarterback as a wide receiver). It is noted that the player's fantasy position should be updated in the case where a player's primary position has changed. For example, in the NFL, it can be determined when the player's NFL team and/or the official statistician of the NFL (e.g. Elias Sports Bureau) has changed a player's position.

Each user (e.g. in the role of a team owner/manager) can designate which players from his/her team roster are to be starters each week (e.g. the only players who are able to "score" any points). The following example is similar to many common formats required for a starting lineup:

1 Quarterback (QB)
2 Running Backs (RB)
2 Wide Receivers (WR)
1 Flex RB/WR/TEs (RB/WR/TE)
1 Tight End (TE)
1 Placekicker (K)
1 Team Defence/Special Teams (D/ST)
6 Bench (BN)

There are many variants on this. Some leagues use individual defensive players (IDPs) (and in some cases a punter) instead of or in addition to a combined Team Defence/Special Teams. Some other leagues use separate Defence and Special Teams. Another variant is the "flex" position, which can be filled by a player in one of several positions. Flex positions are often limited to "WR/TE", "RB/WR", or "RB/WR/TE". In one example, this flex be only RB, WR, and/or TE. In other examples, an online fantasy football league can be configured to enable any position to fill this flex slot as (e.g. as an Offensive Player (OP)). Some leagues also have a two-quarterback requirement for a starting lineup, providing yet another twist into the complexity of different scoring systems and lineups (e.g. see Hendricks, 2007 Fantasy Football Guidebook pg. 21-44).

The online fantasy league can be configured to perform scoring according to various methods. For example, fantasy points can be generated from the various player's action during a real game. When a player on the user's team performs specified action (e.g. a touchdown, a field goal and/or a sack), the user's fantasy team can earn a specified amount of points. The sum of a user's team's starting players' points can be combined and compared against the total for other users' teams for the week. In one example scoring configuration, a user (e.g. a 'league manager') can earn team points based on one or more starting players' performances in weekly NFL games. Players can accumulate points based on statistical output. For example, a touchdown can be worth six points while each yard passed, rushed, or carried may be worth a specified amount of points, and so one for the various performance metrics of utilized player positions. In exemplary cases, players can earn points for passing, rushing, and receiving yards, and the like and users can accumulate these points from the players in the rosters.

Injury/eligibility designations. For example, NFL coaching staffs can be required to provide an injury report that is updated throughout the week. On these reports, players can be listed, inter alia, as:

Out—Not scheduled to play

Doubtful—Players have approximately a 25% chance of playing

Questionable—Players have approximately a 50% chance of playing

Probable—Players are very likely to play in the upcoming week

Each week, the online fantasy league (e.g. NFL.com) can provide the official injury report information for every player in the league associated with the online fantasy league (e.g. the NFL). With this information, users can make the best decisions on which players to start each week. Final injury designations can be made on the game day (e.g. at least one hour before the start of the game). For example, players can be listed as either active (e.g. eligible to play) or inactive (e.g. not eligible to play) for the game.

The online fantasy league can be configured for automatic management of online fantasy sports rosters. For example, users can pre-designated automatic team management decisions. For example, a user can pre-designate one or more available substitute player(s) for a specified player in the event the online fantasy league determines the specified player to be ineligible. For example, a user can pre-designate a list of substitute players. The substitute players can be associated with various metrics with respect to the position of the specified player to be replaced. The online fantasy league can be configured to automatically sort the substitute players based on the various metrics (e.g. with various weighting options pre-designated by the user). In one example, substitute player metrics can be weighted based on attributes of the opposing team and/or players.

For example, it may be known that the opposing team has a weaker defines against passing than rushing. In the event of an automatically player substitution, the metrics of substitute offensive players related to passing can be weighted more than metrics of substitute offensive players related to rushing. So for example, a Tight End with better receiving metrics can be selected to automatically substitute an ineligible Tight End instead of another Tight End with lower receiving metrics. In some examples, the online fantasy league can be configured to attempt to automatically contact the user (e.g. text message, push notifications via a client-side application in the user's mobile device, microblog posts, email, posting to the user's online social network profile, etc.) prior performing the automatic substitution. The online fantasy league can be configured to also provide the sorted list of substitute players and/or the information used to sort the list. As used herein, a mobile device can include, inter alia: a smart phone, a wearable computing device (e.g. a smart watch, a head-mounted display, etc.), a tablet computer, etc.

The online fantasy league can be of several types of online fantasy leagues (e.g. head-to-head, total points leagues, dynasty leagues (e.g. dynasty leagues have a separate draft for rookie players which takes place sometimes before, sometimes after, the actual NFL draft), keeper leagues, salary cap leagues, auction leagues, two quarter back leagues, playoff fantasy football, daily fantasy sports, etc.). For example, the online fantasy league can be a head-to-head leagues. In a head-to-head leagues, a team can match up versus a different team each week. The team that receives the most points of the two receives a win for that particular week. Points can be dictated by the scoring system that is either standard set by the website or custom set by the commissioner. A team's total is the sum of all players' points in the starting lineup. The win-loss record can correlate with the league champion. Teams with the best win-loss record advance to the playoffs. If two teams have the same record, the tie-breaker is then decided by the total points scored in the regular season of the two (or more) tied teams. Further tie-breakers can be added based on league preference. Total points leagues are leagues in which teams accumulate points on an ongoing basis. The league standings are determined by the teams' total points rather than their win-loss record. The teams who accrue the highest total of points throughout the duration of the NFL-regular season advance to the playoffs. In another example, the online fantasy league can be a head-to-head leagues. Total points leagues are leagues in which teams accumulate points on an ongoing basis. The league standings are determined by the teams' total points rather than their win-loss record. The teams who accrue the highest total of points throughout the duration of the NFL-regular season advance to the playoffs. Each owner assigns his/her team a name. A dynasty and/or keeper league can be a league where the user retains some players from year to year.

In a daily fantasy sports example, a user can buy a team for a day. The user can set a budget and every player can have a set cost. For example, a user can buy any players within the user's budget. Overlap of players can occur within a user's lineup (e.g. a player may be owned in half the teams). In one example, the replacement player would have to be under the cost of the injured player.

A statistical algorithm can be utilized to rank the substitute players based on such factors as player statistics, opposing position player statistics, opposing team statistics, player's team statistics, and the like. It is noted that the player's historical statistics, the opposing position player's historical statistics, the opposing team's historical statistics and/or the player's team historical statistics can be automatically sampled by the statistical algorithm. There are several methods which may be used to select a proper sample size and/or use a given sample to make statements (within a range of accuracy determined by the sample size) about a specified population. These methods may include, for example:

1. Classical Statistics as, for example, in "Probability and Statistics for Engineers and Scientists" by R. E. Walpole and R. H. Myers, Prentice-Hall 1993; Chapter 8 and Chapter 9, where estimates of the mean and variance of the population are derived.
2. Bayesian Analysis as, for example, in "Bayesian Data Analysis" by A Gelman, I. B. Carlin, H. S. Stern and D. B. Rubin, Chapman and Hall 1995; Chapter 7, where several sampling designs are discussed.
3. Artificial Intelligence techniques, or other such techniques as Expert Systems or Neural Networks as, for example, in "Expert Systems: Principles and Programming" by Giarratano and G. Riley, PWS Publishing 1994; Chapter 4, or "Practical Neural Networks Recipes in C++" by T. Masters, Academic Press 1993; Chapters 15, 16, 19 and 20, where population models are developed from acquired data samples.

It is noted that these statistical methodologies are for exemplary purposes and other statistical methodologies can be utilized and/or combined in various embodiments. These statistical methodologies can be utilized elsewhere (e.g. in process 100), in whole or in part, when appropriate as well.

FIG. 1 illustrates an example method 100 for automatic management of online fantasy sports rosters, according to some embodiments. In step 102 of process 100, an entity (e.g. the NFL®, the National Basketball Association (NBA®), the National Hockey Association (NHL®), ESPN®, Yahoo®, etc.) can provide and manage an online fantasy sports league. The online fantasy sports league can be an online fantasy football league.

In step 104, a list of automatic substitution designations and/or preferences can be received from the user. For example, the online fantasy football league can manage a web server that provides an online fantasy football league website. The online fantasy football league can provide each user a home page with various web page functionalities to manage the user's teams, interact with other users, obtain players for the user's team, review historical statistics for players and/or teams, etc. An example of an online fantasy football league website that can be utilized in some embodiments is www.nfl.com/fantasyfootball. An automatic substitution designations can be a list of one or more player(s) to be automatically substituted for a starting player in the user's roster in the event the starting player is deemed ineligible to play a game. The automatic substitution preferences that can be used by an online fantasy football league server functionality to algorithmically select a substitution player to automatically replace the ineligible player. Example preferences can include, inter alia: listed substitute players historical statistics, player/team information automatically obtained from online sources (e.g. online scouting reports, online sports journals, online newspapers, microblogs such as Twitter®, etc.), and the like. Player/team information can be a software application that runs automated tasks over the Internet (e.g. an Internet bot). Data scrapping techniques (e.g. screen scraping) or other mechanisms for data interchange can be utilized to obtain the information. Machine learning techniques can be utilized to analyze and sort the data scrapped information (e.g. rank the information). Some sources can be pre-set to have more weight than other sources. For example, a recent ESPN.com article praising a particular player can be weighted greater than a set of tweets from Twitter users with a low number of followers. In one example, a list of substitute players can include two players. The two players can be of equal metrics (e.g. obtained from historical statistics). Data scrapping techniques (e.g. with web bots) can be used to obtain information written about the players in the past thirty days (e.g. the time period and/or data sources can be a preferences set by the user). The user can have set ESPN.com, NFL.com, Facebook and/or Twitter as data sources. A server functionality can then search the data sources and obtain information about the two players. A server functionality can parse and analyze the information to determine a score for each player. Various natural language interpretation, processing and understanding techniques can be used. For example, ESPN.com can have an article discussing how the first player is not playing up to his potential. This can be analyzed and the player can receive a lower score value for that news source. The second player can have be discussed in hundreds of tweets praising the players recent performance, the second player can receive a higher score value with respect to that news source (Twitter). A score for each news source can be calculated. A final new source score can be determined. This news source score can be combined with historical statistics of various relevant entities (e.g. see supra) to determine a final player source. It is noted that historical statistics can be weighted to give preference to more recent statistics (e.g. within the current season vs. past seasons). These calculations can be performed at part of step 110 discussed infra. Other information sources include online producers of scouting reports and sport-specific statistics (e.g. STATS LLC). A user can designate an online scouting report source to be used by the algorithm that automatically ranks his/her list of substitute players.

In some embodiments, step 104 (and/or other methods and systems provided herein) can also include the following. For example, a fantasy team owner can utilize the following methods (or any combination thereof) to acquire a "free agent" to fill a hole in an owner's lineup. If, due to roster restrictions or other league rules, the owner has to drop a player to acquire a new player then the owner can manually select which a player to drop. This manual selection can be implemented in order to avoid a player being automatically selected to be dropped from the roster. This is important in situations where an automatically dropped player could be one of the players the owner would like to retain in the future. Another option can include using the highest estimated point score by the hosted website/application. A third option can include using a customized algorithm provided by the fantasy team owner. In all three options, if it is mandatory to drop a player due to roster restrictions or other league rules, the dropped player can be manually chosen by the fantasy team owner.

An owner can replace an injured player already on his/her team in one of three ways: manually; using the highest estimated point score by the hosted website/app; and/or using a customized algorithm provided by the fantasy team owner. The customized algorithm can be based upon such factors as, inter alia: the scoring system most in line with the specifics of the league rules; the ability for the fantasy team owner to create a weighted average for each information sources (e.g. website, mobile device applications, etc.). For example, the fantasy team owner would like to use the projected points for a player from six sources but wants to weight them 50% for one source of the sources but only 10% for each of the other five source (e.g. 38%/25%/20%/10%/5%/2% or any other permutation). The weights can be set according to any fantasy team owner provided parameter. This information can be included in step 104 and later used to implemented step 110 (infra) of process 100.

In step 106, it can be determined that a player is ineligible to play a game. The player may be injured, for example. In step 108, it can be determined that the player is on the user's starting roster and/or in the user's waiver wire (see infra). In step 110, a server functionality can automatically select a substitute player for the ineligible starting player. The substitution can be automatically performed according to a list of automatic substitution designation and/or preferences from the user (e.g. manually set replacements by the user). In step 112, the user's team roster can be automatically updated to include the substitute player in lieu of the ineligible starting player. Steps 106 to 112 can be repeatedly performed on a periodic basis and/or each time it is determined that a player used by the online fantasy football league is deemed ineligible.

It also noted that the process and/or systems described herein can be implement in other systems than those that utilize websites. Accordingly, they can also be implemented in various computing platforms, such as, inter alia, smartphone application, gaming apps on social networking platforms such as Facebook, etc. It is noted that websites provided herein can include various systems (e.g. radio buttons, check boxes, text input boxes, etc.) for a user to manually select the order of replacement players.

In one example embodiment, a player replacement protocol for can be provided for every player on a user's roster. The replacement protocol can be implemented in the event the player incurs a season ending injured reserve (IR) designation or suffers a long-term injury. For example, each user can choose what length of time qualifies for a long-term injury either for each player individually or the same across their whole roster. If a player goes to the IR or suffers a long-term injury then the user can have the option to have this protocol in place to drop that player from the user's team and either pick up his backup (e.g. manually set or via the team's official depth chart) or pick up any other player on the waiver wire. In the event that said player's backup per the team's depth chart is already taken it will then take the next player down the depth chart. If the user's player goes to the IR or suffers a long-term injury then the user can either a) get sent a notification and/or b) automatically do this. If the fantasy league uses a free agent auction system rather than a waiver wire order system to acquire free agents then the bid amount can be a specific monetary amount, a percentage of the user's remaining budget, a combination of the two, or some other permutation (e.g. a percentage of other team's budgets, one dollar ($1) more than a certain competitor, etc.).

Exemplary Computer Architecture and Systems

Figure 2:
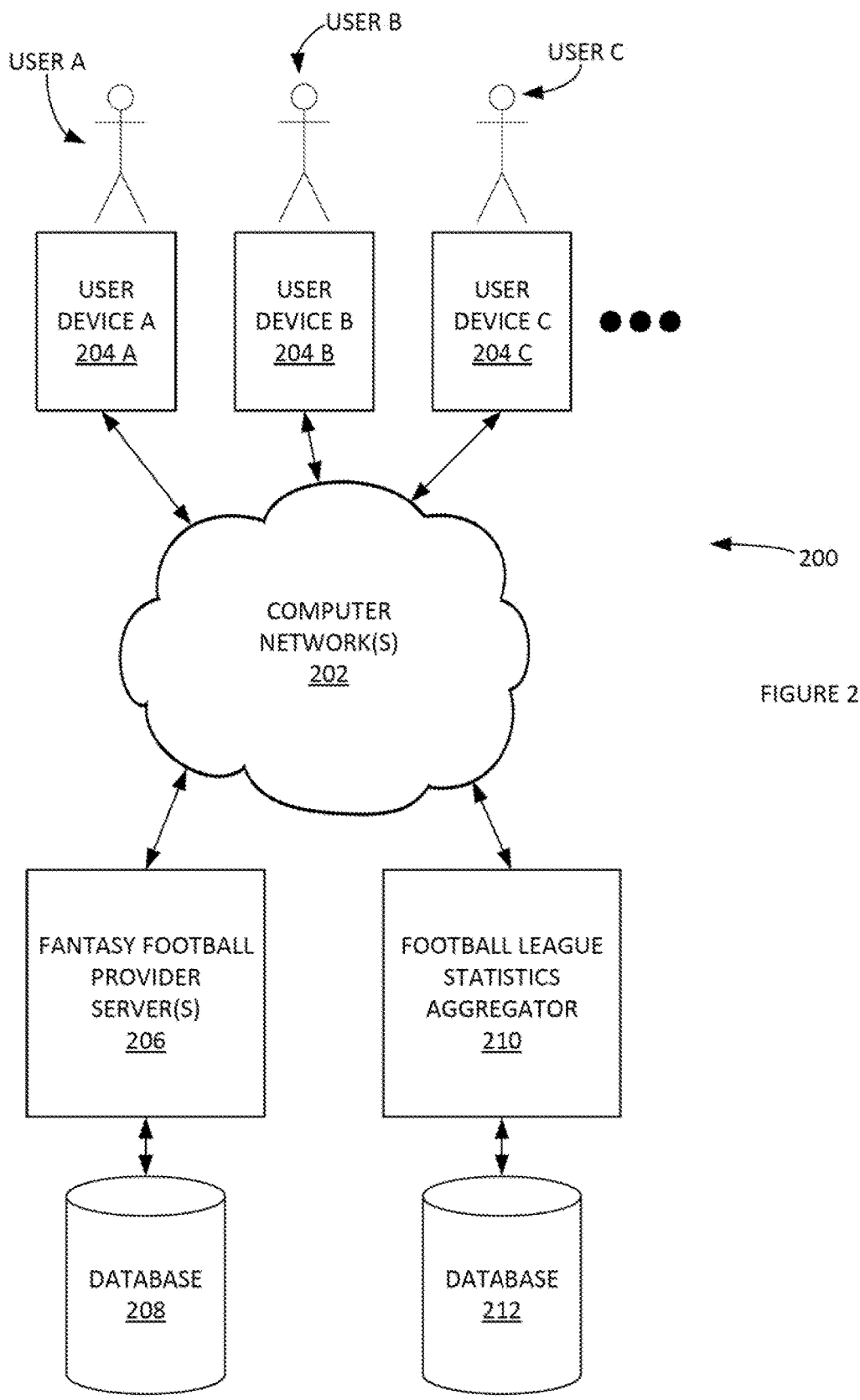
FIG. 2 depicts, in block diagram format, a system for automatic management of online fantasy sports rosters, according to some embodiments.

FIG. 2 depicts, in block diagram format, a system 200 for automatic management of online fantasy sports rosters, according to some embodiments. System 200 can include one or more computer network(s) 202 (e.g. the Internet, enterprise WAN, cellular data networks, etc.). User devices 204 A-C can include various functionalities (e.g. client-applications, web browsers, and the like) for interacting with an online fantasy sports league server (e.g. fantasy football league provider server(s) 206).

Fantasy football league provider server(s) 206 can provide and manage an online fantasy football league. In some embodiments, fantasy football league provider server(s) 206 can be implemented in a cloud-computing environment. Fantasy football league provider server(s) 206 can include the functionalities provided herein, such those of FIG. 3 infra. Fantasy football league provider server(s) 206 can include web servers, database managers, functionalities for calling API's of relevant other systems (e.g. an online sports platform and database), data scrappers, natural language processing functionalities, player ranking functionalities, statistical modelling and sampling functionalities, search engines, text messaging modules (e.g. automatically generate SMS notifications to users), email modules (e.g. automatically generate email notifications to users), microblogging bots, etc. Fantasy football league provider server(s) 206 can include database 208. Database 208 can store data related to the functionalities of fantasy football league provider server(s) 206.

Football league statistic aggregator 210 can aggregated statistics and other information (e.g. player status) from a football league (e.g. the NFL). Football league statistic aggregator 210 can provide API's for other entities to call for the aggregated information. Football league statistic aggregator 210 can microblog the information. Football league statistic aggregator 210 can obtain information from sport writers and/or various other sport news sources. Football league statistic aggregator 210 can maintain and manage database 212. Database 212 can store data related to the functionalities of football league statistic aggregator 210. System 300 can, in some embodiments, include other systems provided in the descriptions of the figures supra.

Figure 3:
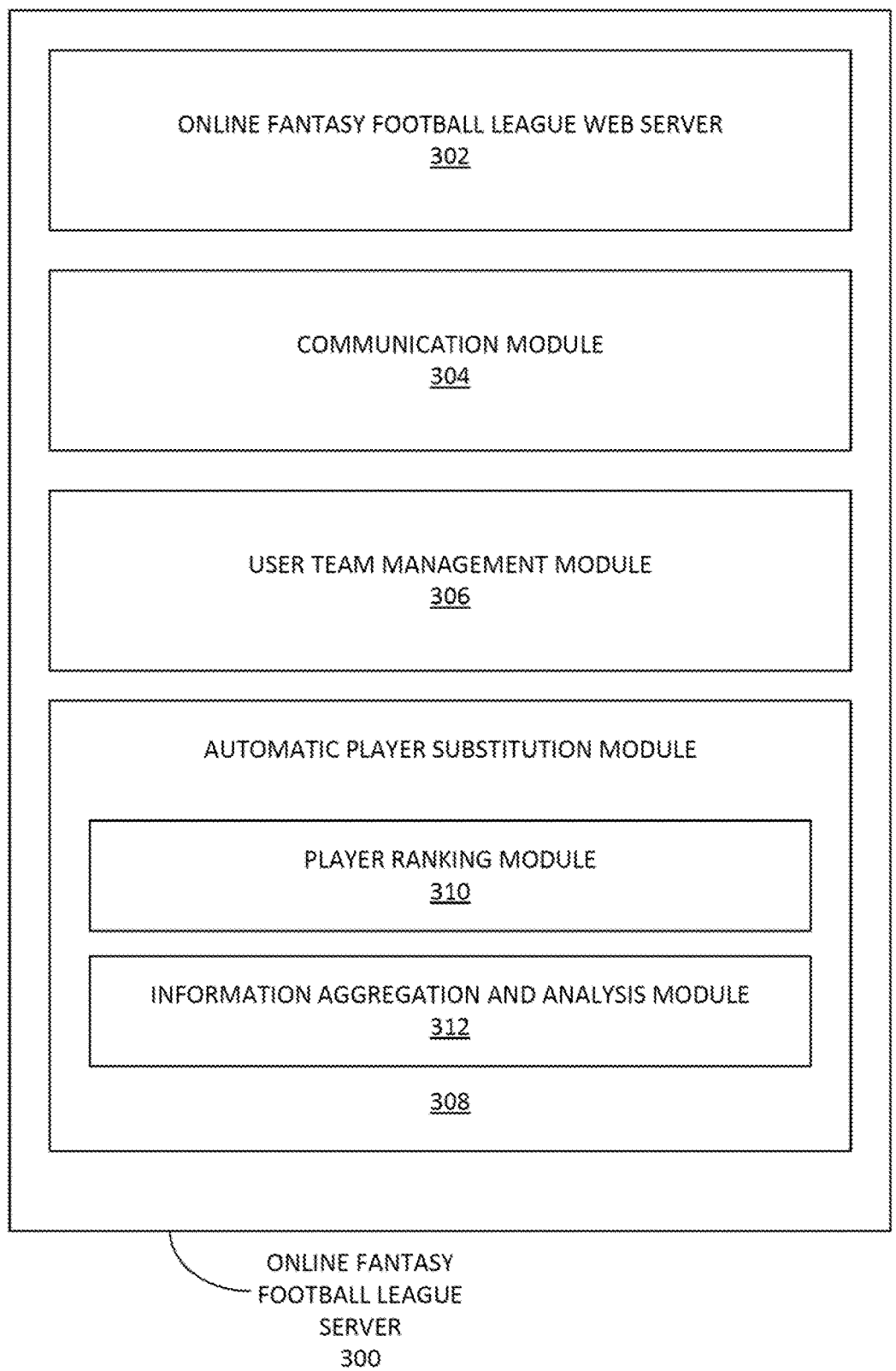
FIG. 3 is a block diagram of an example an online fantasy football league server, according to some embodiments.

FIG. 3 is a block diagram of an example an online fantasy football league server 300, according to some embodiments. Online fantasy football league server 300 can include various functionalities for managing an online fantasy football (and/or other sports fantasy league in other embodiments). Online fantasy football league server 300 can include various functionalities for automatic management of online fantasy sports rosters, such as the automatic substitution of an ineligible/injured player with an available pre-designated player. Online fantasy football league server 300 can include an online fantasy football web server 302 for managing an online fantasy football website. Online fantasy football league server 300 can include a communication module 304. Communication module 304 can send messages to users and/or communicate with other third-party information sources. Online fantasy football league server 300 can include user team management module 306. User team management module 306 can enable users to create and manage fantasy football teams, trade/draft players, communicate with other users, research player/team statistics, obtain current football league information, and the like.

Online fantasy football league server 300 can include automatic player substitution module 308. Automatic player substitution module 308 can receive a list of substitute player(s) to automatically replace a designated player when it is determined that the player will not play. Automatic player substitution module 308 can a player's status to play in a football game. Automatic player substitution module 308 can include player ranking module 310 for ranking the list of substitute players. Substitute players can be ranked on various metric provided herein. Substitute players can be ranked based on user rank designations. Automatic player substitution module 308 can include information aggregation and analysis module 312. Information aggregation and analysis module 312 can obtain information related to the football league and/or analyze said information to rank substitution players according to various metrics. Online fantasy football league server 300 can include other functionalities discussed elsewhere herein. Online fantasy football league server 300 can include an online social network provider and manager. It is noted that online fantasy football league server 300 can include a manual player substitution module (not shown). In this way, a user can also manually select a list of substitute player(s) to replace a designated player when it is determined that the designated player will not play. Various user interfaces and player selection tools can be graphically displayed to a user as a player selection mechanism(s) when the online fantasy football league server 300 provides a manual selection mode. In this way, a user can manually override an automatic player replacement selection performed by an algorithm.

In one example, a waiver wire can be implemented in the automatic player substitution process and systems provided herein. For example, after the Monday night football game, team owners can claim free agents (e.g. players not on a fantasy team's roster). In the event more than one team owner claims a player, a team's waiver wire position can determine which team acquires the player. A team's waiver wire ranking can be determined by such factors as, inter alia: team record, the number of free agents already added, etc. Accordingly, the worse a team's ranking, the more likely they will obtain the highest ranking free agents. In one example, a user may make a waiver wire request for a free agent. The user request may be granted before the beginning of Sunday morning games. The user can place the free agent in the list of automatic substitution designations (e.g. free agent is designated as the second replacement player for a specified position). If the user's team succeeds in the waiver wire request, obtains the free agent and there is a last minute substitution event, then the free agent can be automatically included in the list of possible replacement players. It noted that these embodiments are not restrictive and provided by way of example. For example, in another example fantasy football league, waiver wires can be designated based on user bids regardless of his/her team's current standing.

Figure 4:
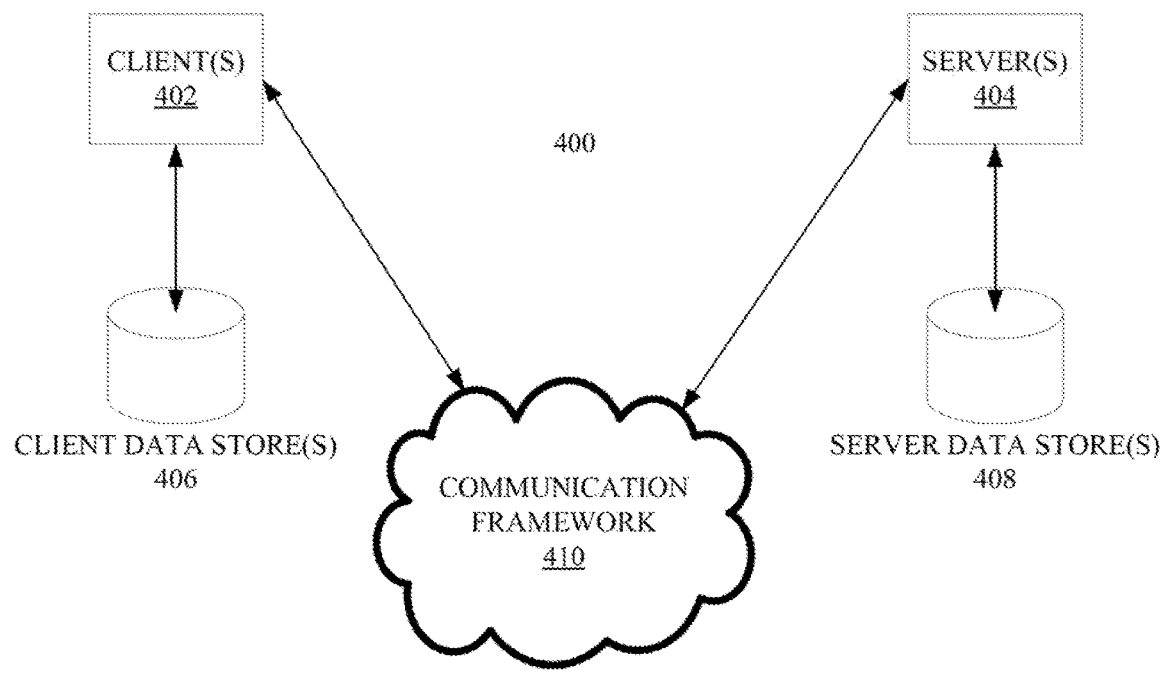
FIG. 4 is a block diagram of a sample computing environment that can be utilized to implement various embodiments.

FIG. 4 is a block diagram of a sample computing environment 400 that can be utilized to implement various embodiments. The system 400 further illustrates a system that includes one or more client(s) 402. The client(s) 402 can be hardware and/or software (e.g., threads, processes, computing devices). The system 400 also includes one or more server(s) 404. The server(s) 404 can also be hardware and/or software (e.g., threads, processes, computing devices). One possible communication between a client 402 and a server 404 may be in the form of a data packet adapted to be transmitted between two or more computer processes. The system 400 includes a communication framework 410 that can be employed to facilitate communications between the client(s) 402 and the server(s) 404. The client(s) 402 are connected to one or more client data store(s) 406 that can be employed to store information local to the client(s) 402. Similarly, the server(s) 404 are connected to one or more server data store(s) 408 that can be employed to store information local to the server(s) 404. In some embodiments, system 400 can instead be a collection of remote computing services constituting a cloud-computing platform.

Figure 5:
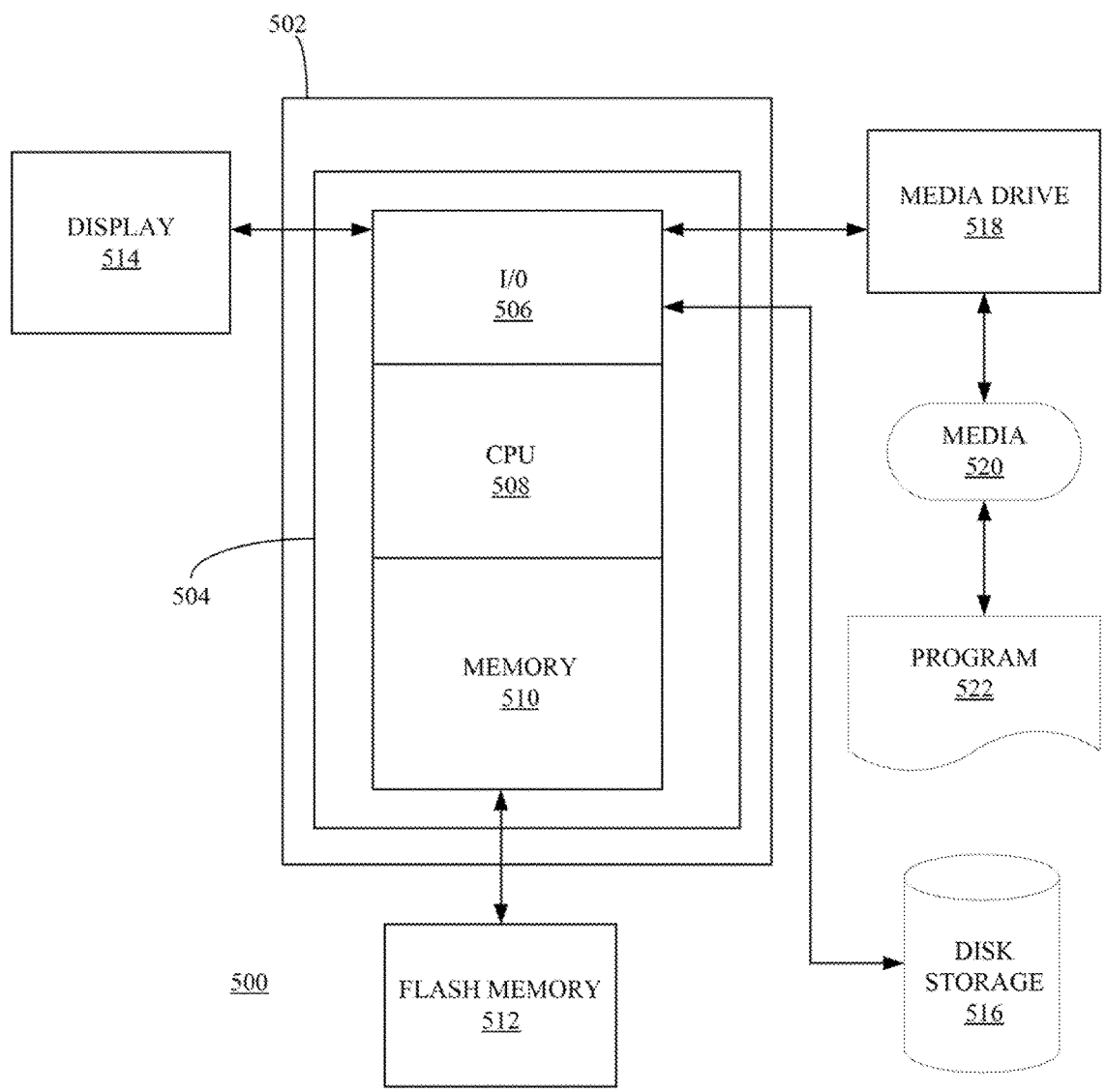
FIG. 5 depicts computing system with a number of components that may be used to perform any of the processes described herein.

FIG. 5 depicts an exemplary computing system 500 that can be configured to perform any one of the processes provided herein. In this context, computing system 500 may include, for example, a processor, memory, storage, and I/O devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform any of the processes described herein. The main system 502 includes a motherboard 504 having an I/O section 506, one or more central processing units (CPU) 508, and a memory section 510, which may have a flash memory card 512 related to it. The I/O section 506 can be connected to a display 514, a keyboard and/or other user input (not shown), a disk storage unit 516, and a media drive unit 518. The media drive unit 518 can read/write a computer-readable medium 520, which can contain programs 522 and/or data. Computing system 500 can include a web browser. Moreover, it is noted that computing system 500 can be configured to include additional systems in order to fulfill various functionalities. Computing system 500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Additional Examples

It is noted that in some online leagues for fantasy sports (such as, hockey, baseball, basketball, etc.) season-long rotisserie scoring system. In those instances, if a player on a user's active roster is deemed "out" (e.g. ineligible) it may sometimes be more beneficial to leave that spot empty rather than replacing with another player. This may be due to the fact the user can simply plug a player in later on in the season when the team for your normal starter is off. Accordingly, in these examples, the user may leave that spot empty rather than replacing with another player.

In some examples, a substitute player can be selected to only replace the ineligible player for a single game. In other examples, the substitute player can designated to replace the ineligible player for a longer period of time (e.g. two or more games, for the period the first player is ineligible, until the playoffs, etc.). Additionally, other substitute players in other positions can be designated to replace eligible players when a certain other player is determined to be ineligible. For example, a quarter back can be determined to be ineligible. In this example, one or more wide receivers can be automatically substituted as well. This example can also be used for defensive players when a specified player on an opposing team is determined to be ineligible. For example, the quarterback of the opposing team can be determined to be ineligible, then specified players/positions on the user's defense lineup can be automatically substituted based on prior user substitution designations.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method of playing online fantasy football comprising:
   prior to the start of a fantasy sports game:
      providing an online fantasy sports league, wherein the online fantasy sports league comprises an online fantasy football league, wherein the online fantasy football league comprises a rotisserie-ruled based online fantasy football league, wherein a user interacts with the online fantasy sports league via an application in a computing device;
      receiving a list of automatic substitution designations from the user via the application with respect to a user's starting roster;
      obtaining a final injury designation for the player from an official league server;
      determining that a user available to manually select the substitute player;
      determining that the list of automatic substitution designations is due to be communicated to the online fantasy sports league server within a specified deadline set by the online fantasy sports league;
      determining that a player is ineligible to play in a game;
      determining that the player is on a user's starting roster;
      automatically selecting a substitute player for an ineligible starting player according a list of automatic substitution designations, and wherein the list of automatic substitution designations is stored in a memory of the computing device or an online fantasy sports league server; and
      automatically updating the user's team roster to include the substitute player in lieu of the ineligible starting player.

2. The method of claim 1, wherein the step of automatically updating the user's team roster to include the substitute player in lieu of the ineligible starting player is implemented only when it is determined that the user is offline and before the specified deadline.

3. The method of claim 1, wherein a position filled by the substitute player comprises a flex position.

4. The method of claim 1, wherein the computerized device comprises a mobile device.

5. A computerized system of playing online fantasy football comprising:
   a processor configured to execute instructions;
   a memory containing instructions when executed on the processor, causes the processor to perform operations that:
      prior to the start of a fantasy sports game:

provide an online fantasy sports league, wherein the online fantasy sports league comprises an online fantasy football league, wherein the online fantasy football league comprises a rotisserie-ruled based online fantasy football league, wherein a user interacts with the online fantasy sports league via an application in a computing device;

receive a list of automatic substitution designations from the user via the application with respect to a user's starting roster;

obtain a final injury designation for the player from an official league server;

determine that a user available to manually select the substitute player;

determine that the list of automatic substitution designations is due to be communicated to the online fantasy sports league server within a specified deadline set by the online fantasy sports league;

determine that a player is ineligible to play in a game;

determine that the player is on a user's starting roster;

automatically select a substitute player for an ineligible starting player according a list of automatic substitution designations, and wherein the list of automatic substitution designations is stored in a memory of the computing device or an online fantasy sports league server;

automatically select another substitute player in another position for an eligible starting player according the list of automatic substitution designations when it is determined that the player is ineligible to play in the game; and automatically update the user's team roster to include the substitute player in lieu of the ineligible starting player.

* * * * *